_United States Patent Office_

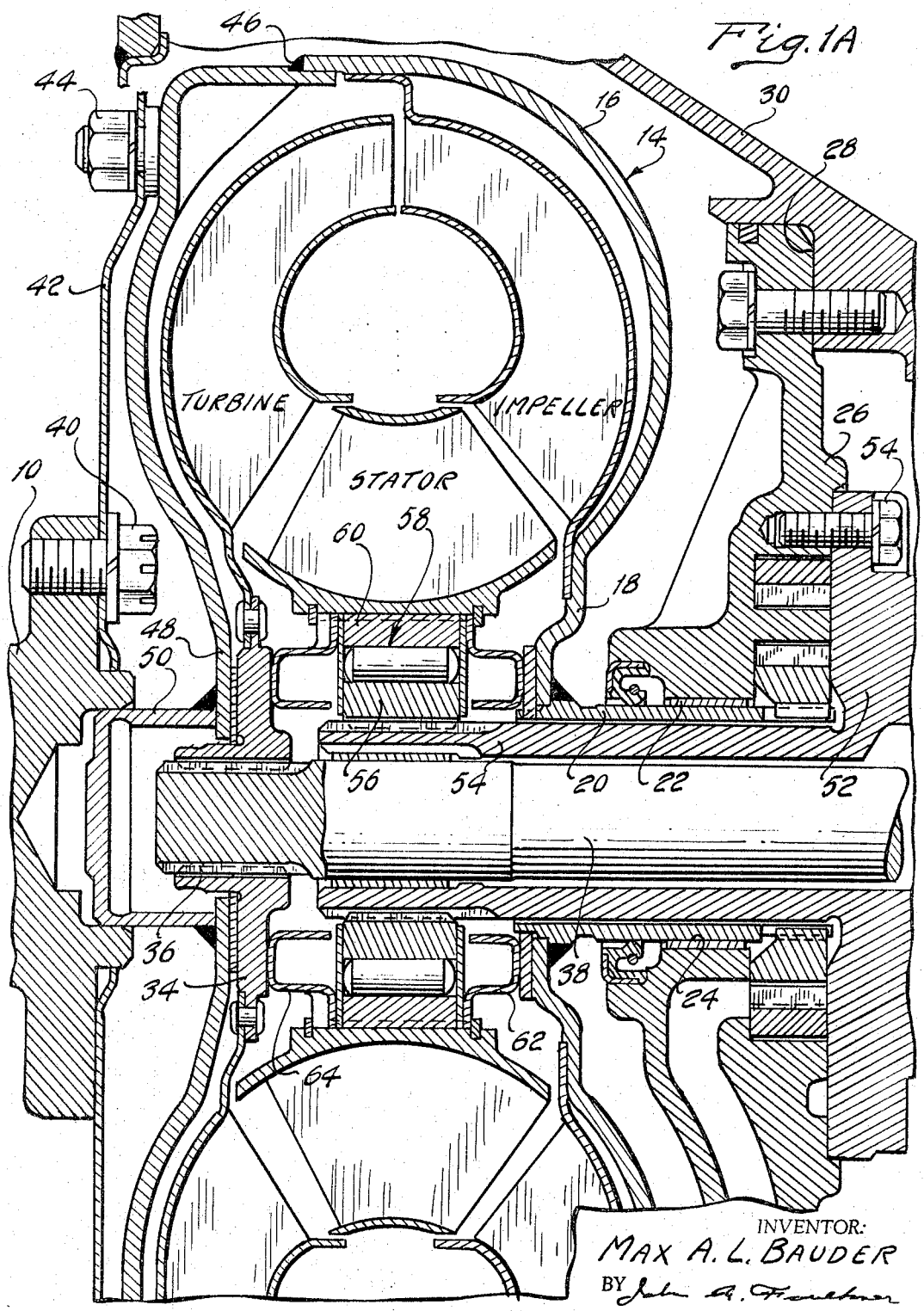

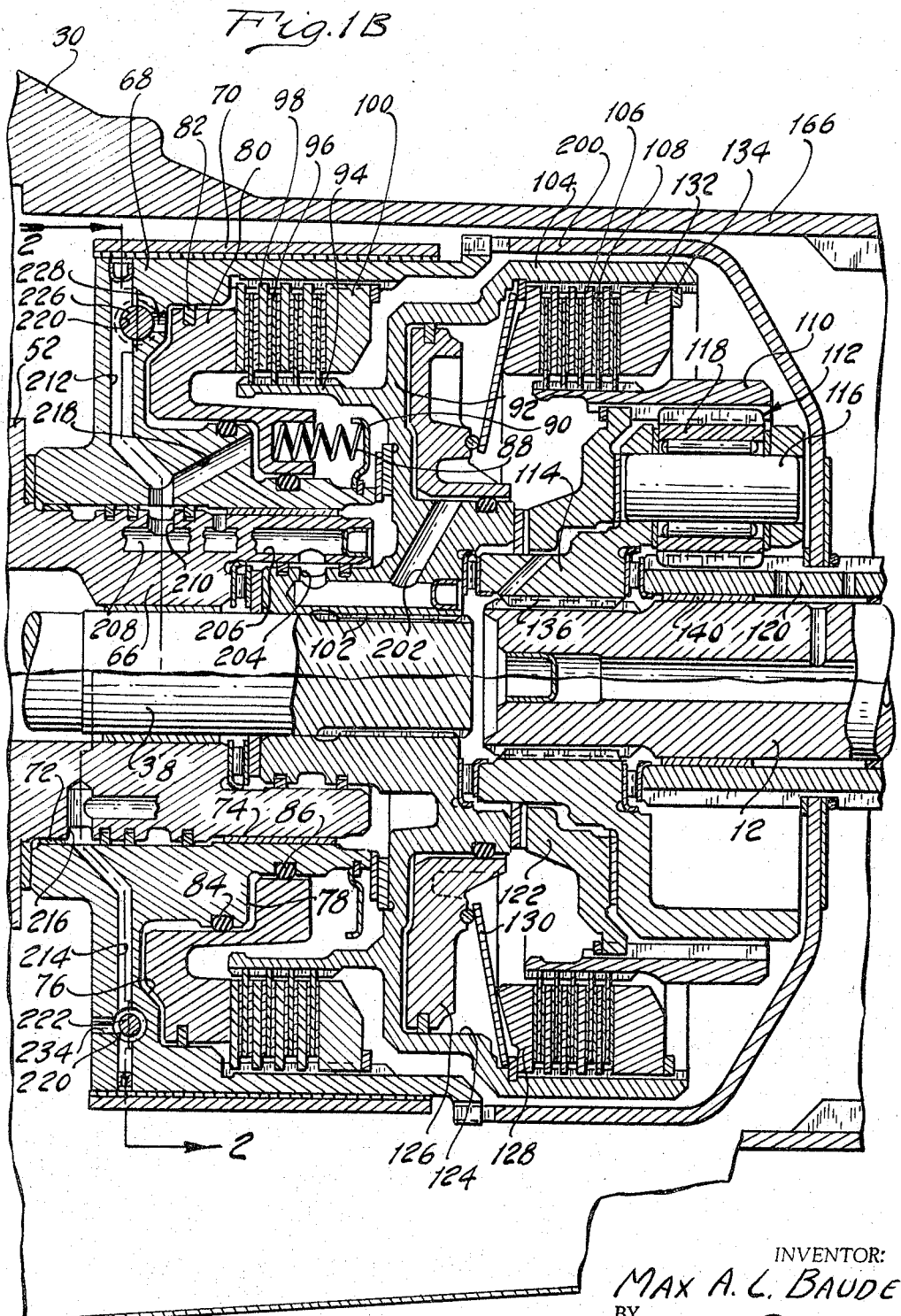

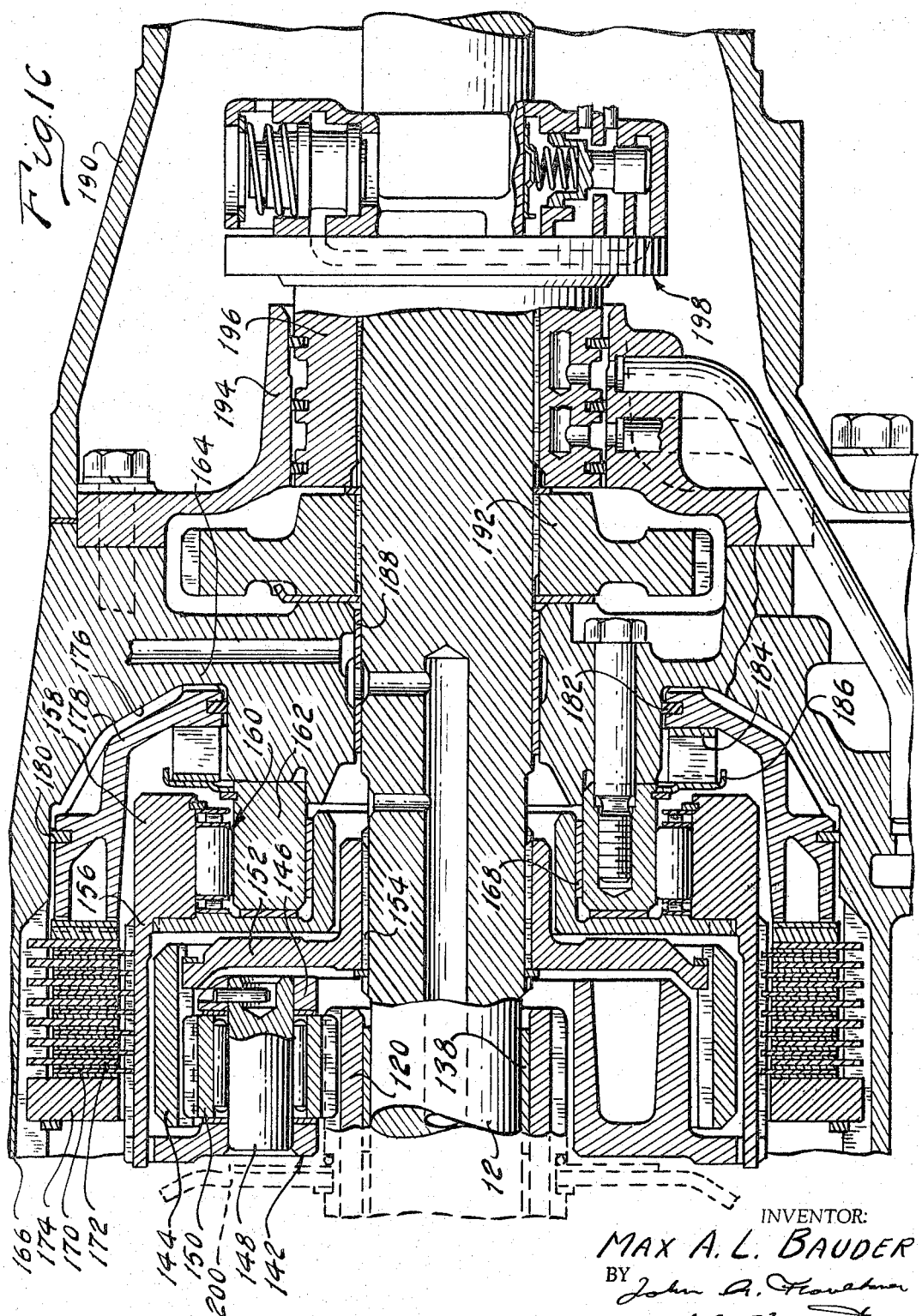

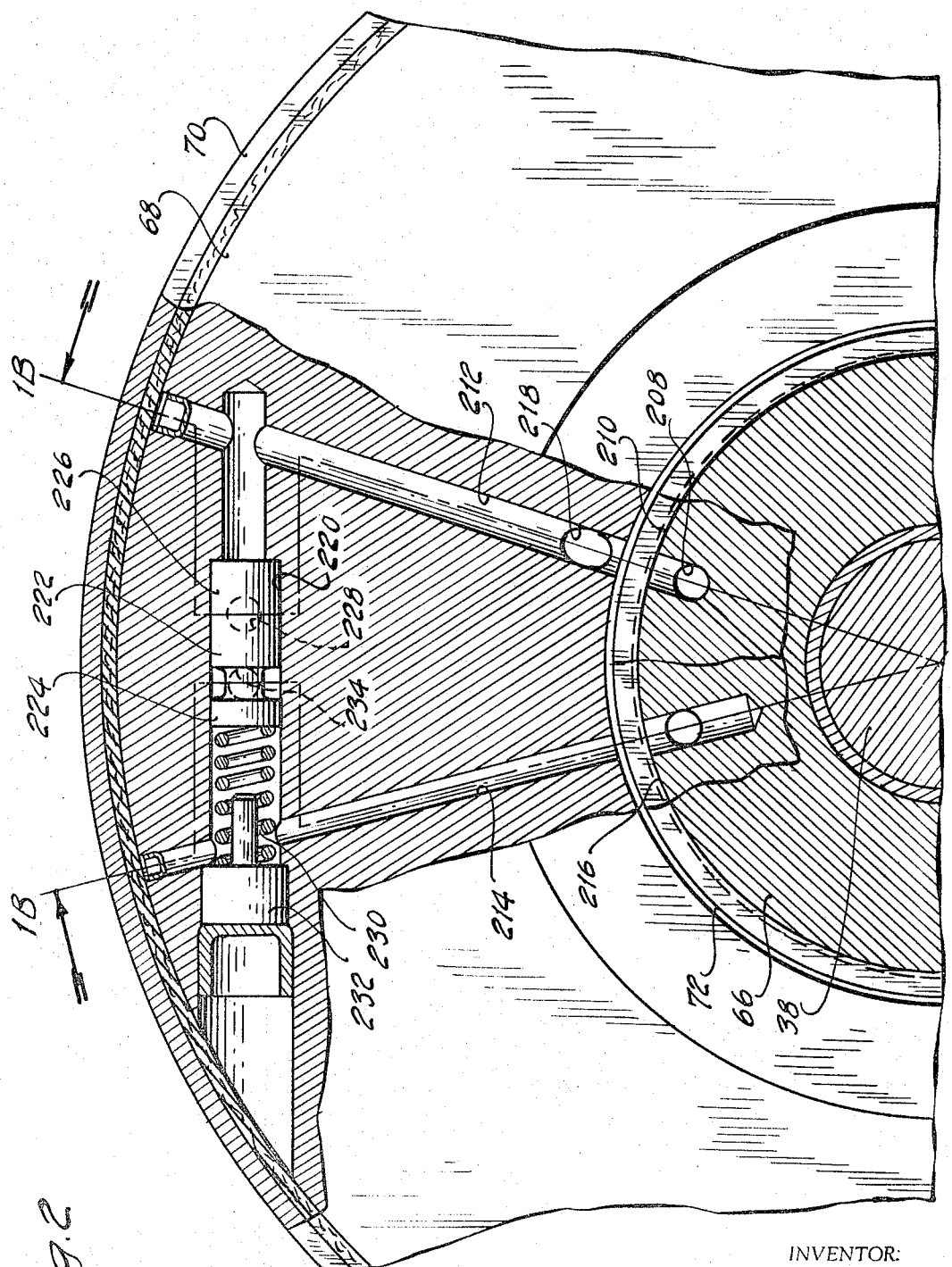

3,307,430
Patented Mar. 7, 1967

3,307,430
TRANSMISSION WITH CLUTCH HAVING DUAL PRESSURE ENGAGING CHAMBERS
Max A. L. Bauder, Livonia, Mich., assignor to Ford Motor Company, Dearborn, Mich., a corporation of Delaware
Filed Oct. 28, 1964, Ser. No. 407,039
6 Claims. (Cl. 74—763)

My invention relates generally to friction couplings having a fluid pressure operated servo, and more particularly to friction disc clutch structure for use in a power transmitting driveline wherein provision is made for tailoring the torque transmitting capacity of the clutch structure to meet changes in the torque delivery requirements of the driveline.

In a preferred embodiment of my invention, I have adapted my improved clutch structure for use in a power transmission gear system for an automotive vehicle driveline. The transmission system includes planetary gear units that define plural torque delivery paths, the relative motion of the elements of the gear units being controlled by clutch and brake structure to produce various speed ratios. The driving member, which may be an engine crankshaft for the internal combustion vehicle engine, is connected to power input portions of the gearing through tandem, fluid pressure operated clutches and through the medium af a hydrokinetic torque converter. The converter comprises a bladed impeller and a bladed turbine situated in toroidal fluid flow relationship in the usual fashion. The turbine is connected to a turbine shaft that in turn is connected drivably to power input portions of each of the two clutches. These clutches include torque output elements that are connected to separate power input elements of the gearing. A power output element of the gearing is connected to the driven member.

Plural brake means are provided for anchoring selectively either one reaction gear element of the gearing or another to provide a reaction point for the system during operation respectively in one or the other of two underdrive speed ratios.

During operation in a high speed, direct-drive ratio, both brakes are released and both clutches are applied to produce a one-to-one driving connection between the turbine shaft and the driven shaft.

In an arrangement of this type it is advantageous to increase the torque transmitting capacity of the friction clutch that is used to establish a reverse power flow path during reverse drive operation. During forward drive operation in those ratios that require engagement of the clutch that is used also for reverse drive operation, a reduced clutch applying pressure is sufficient to accommodate the driving torque. Thus, provision must be made for modifying the engaging pressure of the clutch.

In certain prior art arrangements where a common clutch is used to define in part a torque delivery path for reverse drive operation and also a torque delivery path for forward drive operation in one of several forward speed driving ratios, it is necessary to calibrate the clutch to accommodate the maximum torque that will be encountered during operation. Thus, under those driving conditions that do not require a maximum clutch engaging pressure, the clutch actually has excessive capacity. For example, if the clutch is calibrated to accommodate the increased torque that is experienced during reverse drive operation, it is difficult to obtain a smooth speed ratio shift during forward drive operation from one underdrive ratio to a second underdrive ratio that requires engagement of that same clutch during forward drive operation.

An attempt has been made in certain prior art arrangements to cushion the application of the clutch during such a forward drive speed ratio shift by providing accumulators or various pressure bypass valve arrangements for modifying the clutch pressure during the shift intervals. This is done to improve the shift quality. In my improved clutch arrangement, however, such valve systems and accumulators are not required.

The provision of a friction clutch arrangement of the type briefly described in the foregoing paragraphs being a principal object of my invention, it is a further object of my invention to provide a torque transmitting friction disc clutch in an automotive vehicle driveline wherein two isolated fluid pressure operated servos having common piston and cylinder portions are provided for engaging the clutch. I contemplate that the clutch thus will be provided with separate fluid pressure working chambers that may be pressurized selectively or simultaneously thereby altering the torque transmitting capacity of the clutch structure to satisfy the changing torque delivery requirements of the driveline.

It is a further object of my invention to provide a clutch structure of the type above set forth wherein provision is made for pressurizing one of the working chambers of the clutch and wherein pressure distribution to the other chamber is controlled in response to a pressure build-up in the companion clutch that is engaged during a speed ratio change.

It is a further object of my invention to provide a torque transmitting gear system having multiple brakes and multiple clutches for obtaining plural forward driving speed ratios and a single reverse driving speed ratio and wherein one clutch is engaged during reverse drive operation and both clutches are engaged during forward drive operation in one of the forward driving speed ratios. I contemplate that the one clutch will be applied with a reduced clutch engaging force when its companion clutch is engaged and that a relatively high clutch engaging force will be applied thereto when the companion clutch is disengaged and the transmission mechanism is conditioned for reverse drive operation.

It is a further object of my invention to provide a clutch system of the type set forth in the foregoing object wherein pressure distribution to the servo for the one clutch is controlled in part by valve structure that responds to a pressure build-up in the servo for the companion clutch.

Further features and objects of my invention will become apparent from the following description and from the accompanying drawings, wherein:

FIGURES 1A and 1C show in cross-sectional form the forward and rear portions of a power transmission mechanism capable of accommodating the improved clutch structure of my invention;

FIGURE 1B shows a cross section similar to FIGURES 1A and 1C of the central portion of the power transmission mechanism. It is taken along the plane of section line 1B—1B of FIGURE 2; and FIGURE 2 shows a transverse cross sectional view taken along the plane of section line 2—2 of FIGURE 1.

Referring first to FIGURE 1, numeral 10 designates a portion of the crankshaft of an internal combustion engine in an automotive vehicle driveline. Numeral 12 designates a power output shaft for the transmission system which may be connected to the vehicle traction wheels through a suitable driveshaft and differential and axle assembly, not shown.

A hydrokinetic torque converter mechanism, which is designated generally by reference character 14, includes a bladed impeller having a drive shell 16 and a hub 18, the latter being connected to an impeller driven sleeve shaft 20. This shaft is journaled by means of a bushing 22 within an opening 24 formed in a supporting wall 26. The periphery of the wall 26 is bolted to a shoulder 28 formed on a transmission housing 30. The periphery 32 of the housing 30 can be bolted in the usual fashion to the engine block for the internal combustion engine.

The shell 16 encloses a bladed turbine that is disposed in toroidal fluid flow relationship with respect to the bladed impeller. The turbine is formed with a hub 34 which is splined at 36 to a turbine driven shaft 38.

A flange formed on crankshaft 10 is bolted by means of bolts 40 to a drive plate 42, the periphery of which is bolted at 44 to the shell 16.

Shell 16 is formed in two parts which are welded together, as indicated at 46, to form a sealed enclosure for the fluid of the hydrokinetic torque converter circuit. The hub 48 of the shell 16 carries a pilot portion 50 that is received within a pilot opening formed in the end of crankshaft 10.

A support member 52 bolted at 54 to the wall 26 includes a stator sleeve shaft 54 to which is splined the inner race 56 of an overrunning brake 58. This brake includes an outer race 60, which is disposed within the hub of a bladed stator situated between the flow exit section of the turbine and the flow entrance section of the impeller in the usual fashion. Overrunning brake elements in the form of rollers may be situated between the races 60 and 56 to prevent rotation of the stator in a direction opposite to the direction of rotation of the impeller, but which will permit freewheeling motion of the stator in the other direction. The race 60 can be cammed to permit camming action with the rollers 58. Thrust members or spacers 62 and 64 are situated on either side of the races 60 and 56. The thrust members engage respectively hub 18 and hub 34.

The member 52 includes an axially extending portion 66 upon which is journaled a clutch and brake drum 68. An intermediate speed ratio brake band 70 encircles the drum 68. It may be applied and released by means of a suitable fluid pressure operated servo, not shown. The drum 68 is journaled by bushing 72 and by bushing 74 upon the extension 66. It is formed with an annular cylinder having two cylindrical portions 76 and 78. A stepped diameter annular piston 80, which is received within the cylinder portion 76 and 78, cooperates therewith to define a pair of fluid pressure working chambers. Piston 80 carries a sealing ring 82, and the drum 68 carries sealing rings 84 and 86, each ring being situated within a cooperating annular groove.

Piston return springs 88 engage piston 80, and they are anchored upon annular spring seat 90 that is held axially fast upon the hub portion of drum 68 by means of a snap ring, as indicated. A clutch member 92 is formed with an externally splined portion 94 which carries internally splined clutch discs 96. These discs are situated in interdigital relationship with respect to externally splined discs 98 which are carried by an internally splined portion of the drum 68. A clutch disc backup member 100 is held axially fast by means of a snap ring within the drum 68. The piston 80 is adapted to engage the discs and to urge them into clutching engagement as fluid pressure is admitted into one or both of the cylinders 76 and 78.

Clutch member 92 is splined at 102 to the turbine driven shaft 38. Member 92 includes a drum portion 104 which is internally splined to facilitate a connection with externally splined clutch discs 106 of a rear clutch disc assembly. Internally splined clutch discs 108 of the rear clutch assembly are situated in interdigital relationship with respect to the discs 106, and they are carried by an externally splined extension of ring gear 110 for a planetary gear unit 112. The carrier 114 for the unit 112 includes a plurality of pinion shafts 116 upon which are journaled planetary pinions 118. These pinions engage ring gear 110 and an elongated sun gear 120. Ring gear 110 is supported by a radially extending side member 122.

Drum portion 104 of the clutch member 92 defines an annular cylinder 124. An annular piston 126 is positioned within the cylinder 124 and cooperates therewith to define a fluid pressure working chamber.

A pressure plate 128 is carried by teh drum portion 104 of the rear clutch assembly and is adapted to engage the friction disc assembly. A Belleville washer spring 130 is connected at its outer periphery to the inner periphery of the drum portion 104. The inner periphery of the Belleville spring 130 engages the piston 126. An intermediate portion of the spring 130 engages the pressure plate 128.

A reaction ring 132 is splined to the drum portion 104 and is held axially fast by means of a snap ring 134. As fluid pressure is admitted into the working chamber defined by the piston 126 and the cylinder 124, the discs 106 and 108 establish a driving connection between member 92 and ring gear 110.

Carrier 114 is splined at 136 to the power output shaft 12. Sun gear 120 is journaled upon the shaft 12 by bushings 138 and 140, as indicated.

A rear planetary gear unit 142 includes the sun gear 120, a ring gear 144 and a carrier 146. Carrier 146 is provided with pinion shafts 148 upon which are journaled planetary pinions 150. These pinions drivably engage ring gear 144 and sun gear 120.

Ring gear 144 is supported by member 152, which is splined at 154 to the power output shaft 12. Carrier 146 is connected to an externally splined drum 156 which forms an outer race 158 for an overrunning brake 160. The inner race 162 for the brake 160 is secured to the wall 164 for a transmission housing 166. Brake 160 inhibits the rotation of the carrier 152 in a direction opposite to the direction of rotation of the turbine driven shaft 38. It accommodates, however, overrunning motion of the carrier in the opposite direction. Race 158 and drum 156 are supported upon race 162, which defines a boss. Suitable bearings, shown in part at 168, are provided for this purpose.

Drum 156 is externally splined to facilitate a connection with internally splined brake discs 170. These discs are situated in interdigital relationship with respect to externally splined discs 172, which are carried by an externally splined portion of the housing 166. A clutch disc backup member 174 also is carried by the housing 166 and is held axially fast by means of a snap ring, as indicated.

Wall 164 defines an annular cylinder 176 within which is slidably positioned an annular piston 178. Sealing rings 180 and 182 provide sealing contact between the piston and the walls of the cylinder. The piston is adapted to engage the discs 172 and 170 as fluid pressure is admitted to the pressure chamber defined by the cylinder 176. A leaf-type return spring 184 is situated between the piston 178 and the backup member 186 carried by the boss of which race 162 forms a part.

Shaft 12 is journaled by means of a bushing 188 within an opening formed in the wall 164. Shaft 12 extends rearwardly through a tail shaft extension housing 190, which may be bolted to the end of the housing 166. A transmission parking brake 192 is splined to shaft 12 which may be engaged by a parking pawl or ratchet to brake the shaft 12. The pawl or ratchet can be operated by the vehicle operator.

A sleeve 194 encircles a manifold member 196 which forms a part of the control valve system for actuating the clutch and brake servos. A governor valve assembly 198 carried by shaft 12 is adapted to rotate therewith and modulate pressure made available to it through the manifold member 196 to produce a pressure signal that is of proportion in magnitude to the driven speed of shaft 12.

A drive shell 200 drivably connects the sun gear and the front clutch disc assembly.

To establish low speed-ratio, forward drive operation, the rear clutch assembly 106 and 108 is engaged. Turbine torque then is transferred through shaft 38 and through the engaged rear clutch to the ring gear 110. This tends to drive the sun gear 120 in a direction opposite to the direction of rotation of the shaft 38. This is due to the fact that the carrier 114 is splined to the load shaft 12, which tends to resist rotation.

The reverse motion of the sun gear 120 tends to drive ring gear 144 of the rear planetary gear unit 142 in a forward driving direction. Overrunning brake 160 anchors the carrier 146 so that it can function as a reaction member for the gear system. The forward driving torque applied to the ring gear 144 is distributed to the power output shaft 12. Thus, a split torque delivery path is provided during operation in this speed ratio.

To establish a shift to the next highest speed ratio, it merely is necessary to apply brake band 70 while the rear clutch disc assembly 106 and 108 remains applied. This anchors sun gear 120. Thus, the turbine torque that is delivered to the ring gear 110 causes the carrier 114 and the power output shaft 12 to be driven at an increased speed relative to the speed of shaft 38 while sun gear 120 acts as a reaction member. Overrunning brake 160 freewheels under these conditions and the rear planetary gear unit 142 forms no part of the torque delivery path as the transmission mechanism is conditioned for operation in this speed ratio.

To condition the mechanism for high speed-ratio operation, both friction disc clutch assemblies are applied and all the friction brake assemblies are released. Thus, the sun gear 120 becomes locked to ring gear 110, and the elements of the planetary gear system rotate in unison with a one-to-one gear ratio.

To establish continuous operation in the low speed-ratio, brake disc assembly 170 and 172 can be engaged while the rear clutch disc assembly 106 and 108 remains applied. The mechanism is incapable of shifting to a higher speed ratio during operation in this range. The friction brake assembly complements the action of the overrunning coupling and is capable of resisting rotation of the carrier in each direction. Thus, coast braking can be accommodated.

To establish reverse drive operation, the rear clutch disc assembly 106 and 108 is released and the front clutch disc assembly 96 and 98 is applied. Also, the rear brake disc assembly, shown in part at 170 and 172, is applied thus anchoring the rear carrier 146. Driven torque then is delivered from shaft 38 and through the applied front disc clutch assembly to the sun gear 120.

The forward rotation of the sun gear 120 thus causes ring gear 144 to rotate in a rearward direction as the carrier 146 is anchored. This causes power output shaft 12 to rotate in a reverse direction. The front planetary gear unit 112 forms no part of the reverse power flow path during reverse drive operation.

Fluid pressure can be admitted to the pressure chamber defined by the cylinder 124 through internal passage structure shown in part at 202 which communicates with a radial port 204 formed in the clutch member 92. This port in turn communicates with a passage 206 formed in the extension 66. Passage 206 in turn communicates with the control valve system which distributes pressure to the passage 206 during those drive intervals in which engagement of the rear clutch disc assembly is required.

A separate pressure feed passage 208 is formed in the extension 66, and it also communicates with a portion of the control valve system. Passage 208 communicates with a radial port 210 which in turn communicates with a radially extending passage 212 formed in the drum 68. A signal pressure passage 214 is formed in the drum 68, and it communicates with a port 16 formed in extension 66. Port 216 in turn is in fluid communication with passage 206 which extends to the feed passage for the rear clutch disc assembly.

Passage 212 communicates by means of a feed passage 218 with the annular working chamber defined by the cylinder portion 78 which, as previously explained, is sealed and semi-isolated from the cylinder portion 76.

A spring 230 is situated between the spool 222 and a spring retainer 232. An exhaust port 234 is in communication with bore 222, and when the valve spool 222 assumes the position shown, it establishes fluid communication between the chamber defined by the cylinder portion 76 and the exhaust region.

It will be apparent from the foregoing that it is possible to apply the front clutch disc assembly with a greater engaging force during reverse drive operation than during forward drive operation in the high speed ratio. Engagement of the clutch is required in each instance, but the torque transmitting requirements during reverse drive operation are much greater than they are during high speed-ratio, direct drive operation.

During reverse drive operation, the rear clutch is released, as explained previously. Thus passage 214 is not pressurized. Hence, the only force acting in the right-hand direction upon the valve spool 222 is the force of spring 230. Therefore, when the valve system functions to distribute pressure to passage 218 to pressurize the radially inward working chamber defined by the cylinder portion 78, passage 212 conducts that presure to the right-hand end of the valve land 226. This overcomes the force of spring 230 and permits fluid communication to be established between passage 228 and passage 212. This, then, causes the radially outward fluid pressure area defined in part by the cylinder portion 76 to become pressurized. Thus, the entire working area of the piston 80 is pressurized.

During forward drive operation when a speed ratio shift from the intermediate speed ratio to the direct drive high speed ratio is initiated, both clutches are pressurized, as explained previously. Under these conditions, passage 214 becomes pressurized as it communicates with the bore 220. The pressure acts upon the land 224 to urge the spool 222 in a right-hand direction. Thus, the clutch pressure force opposes and balances the pressure force acting upon the land 226. Thus, the spool 222 will remain in position as shown in FIGURE 2. Communication then is interrupted between passage 212 and passage 228.

Having thus described the preferred embodiment of my invention, what I claim and desire to secure by U.S. Letters Patent is:

1. In a power transmission mechanism adapted to deliver driving torque from a driving member to a driven member, gearing establishing plural torque delivery paths between said driving and driven members, clutch and brake means for controlling the relative motion of elements of said gearing to establish plural torque delivery ratios, said clutch and brake means including a first torque delivery clutch that is engaged during operation in one speed ratio, said clutch and brake means including also a second clutch that is engaged simultaneously with said first clutch during operation in a second speed ratio, said first clutch comprising a brake drum drivably connected to one of said members, first friction elements carried by said drum, another clutch element connected to torque delivery portions of said mechanism, said other clutch element carrying other friction elements that are adapted to engage said first friction elements, a stepped diameter piston disposed in said cylinder and cooperating therewith to define a pair of semi-isolated pressure chambers, means for distributing pressure to one of said chambers to engage said one clutch with a first clutch engaging force, auxiliary passage means establishing communication between said chambers, valve means for opening and blocking said auxiliary passage means, and a signal pressure passage extending from fluid pressure sensitive portions of said other clutch to said valve means for distributing to the latter a pressure signal for actuating the same.

2. In a power transmission mechanism adapted to deliver driving torque from a driving member to a driven member, gearing establishing plural torque delivery paths between said driving and driven members, clutch and brake means for controlling the relative motion of elements of said gearing to establish plural torque delivery ratios, said clutch and brake means including a first torque delivery clutch that is engaged during operation in one speed ratio, said clutch and brake means including also a second clutch that is engaged simultaneously with said first clutch during operation in a second speed ratio, said first clutch comprising a brake drum drivably connected to one of said members, first friction elements carried by said drum, another clutch element of said first clutch being connected to torque delivery portions of said mechanism, said other clutch element carrying other friction elements that are adapted to engage said first friction elements, a stepped diameter annular cylinder defined by said drum, a stepped diameter piston disposed in said cylinder and cooperating therewith to define a pair of semi-isolated pressure chambers, pressure feed passage means for distributing pressure to one of said chambers to engage said first clutch with a first clutch engaging force, auxiliary passage means establishing communication between said chambers, valve means for opening and blocking said auxiliary passage means, and a signal pressure passage extending from fluid pressure sensitive portions of said second clutch to said valve means for distributing to the latter a pressure signal for actuating the same, said valve means being urged to an auxiliary passage opening position when said second clutch means is released thereby permitting pressure to be distributed directly from the feed passage means for said first clutch to each pressure chamber.

3. In a power transmission mechanism adapted to deliver driving torque from a driving member to a driven member, gearing establishing plural torque delivery paths between said driving and driven members, clutch and brake means for controlling the relative motion of elements of said gearing to establish plural torque delivery ratios, said clutch and brake means including a first torque delivery clutch that is engaged during operation in one speed ratio, said clutch and brake means including also a second clutch that is engaged simultaneously with said first clutch during operation in a second speed ratio, said first clutch comprising a brake drum drivably connected to one of said members, first friction elements carried by said drum, another clutch element connected to torque delivery portions of said mechanism, said other clutch element carrying other friction elements that are adapted to engage said first mentioned friction elements, a stepped diameter piston disposed in said cylinder and cooperating therewith to define a pair of semi-isolated pressure chambers, means for distributing pressure to one of said chambers to engage said one clutch with a first clutch engaging force, auxiliary passage means establishing communication between said chambers, valve means for opening and blocking said auxiliary passage means, a signal pressure passage extending from fluid pressure sensitive portions of said other clutch to said valve means for distributing to the latter a pressure signal for actuating the same, one pressure chamber being located radially inwardly of the other, each pressure chamber being sealed thereby semi-isolating one with respect to the other, said valve means comprising a valve bore formed in said one clutch member, a slidable valve element disposed in said bore, said auxiliary passage means communicating with said bore, said valve element being capable of assuming either of two positions, said valve element blocking said auxiliary passage when it assumes one position and uncovering said auxiliary passage when it assumes another position, said bore being in fluid communication with the feed passage for said one pressure chamber thereby tending to urge said valve to an auxiliary passage opening position, and spring means for normally biasing said valve element to an auxiliary passage blocking position.

4. In a power transmission mechanism adapted to deliver driving torque from a driving member to a driven member, gearing establishing plural torque delivery paths between said driving an driven members, clutch and brake means for controlling the relative motion of elements of said gearing to establish plural torque delivery ratios, said clutch and brake means including a first torque delivery clutch that is engaged during operation in one speed ratio, said clutch and brake means including also a second clutch that is engaged simultaneously with said first clutch during operation in a second speed ratio, said first clutch comprising a brake drum drivably connected to one of said members, first friction elements carried by said drum, another clutch element connected to torque delivery portions of said mechanism, said other clutch element carrying other friction elements that are adapted to engage said first friction elements, a stepped diameter piston disposed in said cylinder and cooperating therewith to define a pair of semiisolated pressure chambers, means for distributing pressure to one of said chambers to engage said one clutch with a first clutch engaging force, auxiliary passage means establishing communication between said chambers, valve means for opening and blocking said auxiliary passage means, a signal pressure passage extending from fluid pressure sensitive portions of said other clutch to said valve means for distributing to the latter a pressure signal for actuating the same, one pressure chamber being located radially inwardly of the other, each pressure chamber being sealed thereby semi-isolating one with respect to the other, said valve means comprising a valve bore formed in said one clutch member, a slidable valve element disposed in said bore, said auxiliary passage means communicating with said bore, said valve element being capable of assuming either of two positions, said valve element blocking said auxiliary passage when it assumes one position and uncovering said auxiliary passage when it assumes another position, said bore being in fluid communication with the feed passage for said one pressure chamber thereby tending to urge said valve to an auxiliary passage opening position, and spring means for normally biasing said valve element to an auxiliary passage blocking position, said signal passage means communicating with said bore in the region of said spring means thereby distributing to said bore a signal pressure when said second clutch is applied to assist the valve actuating force of said spring means.

5. In a power transmission mechanism adapted to deliver driving torque from a driving member to a driven member, gearing establishing plural torque delivery paths between said driving and driven members, clutch and brake means for controlling the relative motion of elements of said gearing to establish plural torque delivery ratios, said clutch and brake means including a first torque delivery clutch that is engaged during operation in one speed ratio, said clutch and brake means including also a second clutch that is engaged simultaneuosly with said first clutch during operation in a second speed ratio, said first clutch comprising a brake drum drivably connected to one of said members, first friction elements carried by said drum, another clutch element connected to torque delivery portions of said mechanism, said other clutch element carrying other friction elements that are adapted to engage said first mentioned friction elements, a stepped diameter piston disposed in said cylinder and cooperating therewith to define a pair of semi-isolated pressure chambers, means for distributing pressure to one of said chambers to engage said one clutch with a first clutch engaging force, auxiliary passage means establishing communication between said chambers, valve means for opening and blocking said auxiliary passage means, a signal pressure passage extending from fluid pressure sensitive portions of said other clutch to said valve means for distributing to the latter a pressure signal for actuating the same, one pressure chamber being located radially inwardly of the other, each pressure chamber being sealed thereby semi-isolating one with respect to the other, said valve means comprising a valve bore formed in said one clutch member, a slidable valve element disposed in said bore, said auxiliary passage means communicating with said bore, said valve element being capable of assuming either of two positions, said valve element blocking said auxiliary passage when it assumes one position and uncovering said auxiliary passage when it assumes another position, said bore being in fluid communication with the feed passage for said one pressure chamber thereby tending to urge said valve to an auxiliary passage opening position, and spring means for normally biasing said valve element to an auxiliary passage blocking position, said brake means including selectively engageable brakes for selectively anchoring separate elements of said gear system, said first clutch and one brake being applied to establish reverse drive operation, said second clutch and another brake being applied to establish a forward drive speed ratio.

6. In a power transmission mechanism adapted to deliver driving torque from a driving member to a driven member, gearing establishing plural torque delivery paths between said driving and driven members, clutch and brake means for controlling the relative motion of elements of said gearing to establish plural torque delivery ratios, said clutch and brake means including a first torque delivery clutch that is engaged during operation in one speed ratio, said clutch and brake means including also a second clutch that is engaged simultaneously with said first clutch during operation in a second speed ratio, said first clutch comprising a brake drum drivably connected to one of said members, first friction elements carried by said drum, another clutch element connected to torque delivery portions of said mechanism, said other clutch element carrying other friction elements that are adapted to engage said first friction elements, a stepped diameter piston disposed in said cylinder and cooperating therewith to define a pair of semi-isolated pressure chambers, means for distributing pressure to one of said chambers to engage said one clutch with a first clutch engaging force, auxiliary passage means establishing communication between said chambers, valve means for opening and blocking said auxiliary passage means, a signal pressure passage extending from fluid pressure sensitive portions of said other clutch to said valve means for distributing to the latter a pressure signal for actuating the same, one pressure chamber being located radially inwardly of the other, each pressure chamber being sealed thereby semi-isolating one with respect to the other, said valve means comprising a valve bore formed in said one clutch member, a slidable valve element disposed in said bore, said auxiliary passage means communicating with said bore, said valve element being capable of assuming either of two positions, said valve element blocking said auxiliary passage when it assumes one position and uncovering said auxiliary passage when it assumes another position, said bore being in fluid communication with the feed passage for said one pressure chamber thereby tending to urge said valve to an auxiliary passage opening position, and spring means for normally biasing said valve element to an auxiliary passage blocking position, said signal passage means communicating with said bore in the region of said spring means thereby distributing to said bore a signal pressure when said second clutch is applied to assist the valve actuating force of said spring means, said brake means including selectively engageable brakes for selectively anchoring separate elements of said gear system, said first clutch and one brake being applied to establish reverse drive operation, said second clutch and another brake being applied to establish a forward drive speed ratio.

References Cited by the Examiner

UNITED STATES PATENTS

| | | |
|---|---|---|
| 2,895,344 | 7/1959 | Holdeman et al. |
| 2,916,122 | 12/1959 | Hindmarch _____ 192—109 X |
| 2,979,176 | 4/1961 | Woth _____ 192—109 X |

BENJAMIN W. WYCHE, III, *Primary Examiner.*